(12) United States Patent
Nguyen et al.

(10) Patent No.: US 9,307,519 B2
(45) Date of Patent: Apr. 5, 2016

(54) NEIGHBORING CELL PAGING AT BORDER MOBILE SWITCHING CENTER

(75) Inventors: John C. Nguyen, Naperville, IL (US);
David S. Benco, Winfield, IL (US);
Paresh Kanabar, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 2441 days.

(21) Appl. No.: 12/008,599

(22) Filed: Jan. 11, 2008

(65) Prior Publication Data

US 2009/0181674 A1   Jul. 16, 2009

(51) Int. Cl.
*H04W 68/00* (2009.01)
*H04W 68/06* (2009.01)
*H04W 8/30* (2009.01)

(52) U.S. Cl.
CPC ............. *H04W 68/06* (2013.01); *H04W 8/30* (2013.01)

(58) Field of Classification Search
CPC ....................................... H04W 8/30
USPC ........ 455/432.1, 435.1, 458, 422.1, 515, 379, 455/404.1, 404.2, 521, 433, 435, 432.2, 455/413, 312, 313, 438
See application file for complete search history.

(56) References Cited

U.S. PATENT DOCUMENTS

| | | | |
|---|---|---|---|
| 7,512,403 B2 * | 3/2009 | Rajkotia et al. | 455/438 |
| 7,787,889 B1 * | 8/2010 | Patini | 455/456.1 |
| 2005/0192034 A1 * | 9/2005 | Munje | 455/458 |

* cited by examiner

*Primary Examiner* — Vladimir Magloire
*Assistant Examiner* — Sayed T Zewari
(74) *Attorney, Agent, or Firm* — Fay Sharpe LLP

(57) ABSTRACT

A method is provided for paging a mobile station (40) served by a wireless telecommunications network (A). The method includes: remembering a last known location of the mobile station (40), and implementing a first paging strategy for the mobile station (40) within a first collection of cells (32) served by a first mobile switching center (20). If a response to the first paging strategy is not received by the first mobile switching center (20), then the method further includes: selecting one or more cells (32) served by a second mobile switching center (22) based upon the last known location of the mobile station (40); identifying the selected cells (32) in an intersystem paging request; forwarding the intersystem paging request from the first mobile switching center (20) to the second mobile switching center (22); and, in response to the second mobile switching center (22) receiving the intersystem paging request, paging the mobile station (40) in those cells (32) served by the second mobile switching center (22) which are identified in the intersystem paging request.

6 Claims, 2 Drawing Sheets

NEIGHBORING CELL PAGING AT BORDER MOBILE SWITCHING CENTER

FIELD

The present inventive subject matter relates to the wireless or mobile telecommunications arts. Particular application is found in conjunction with paging a mobile station (MS), and the specification makes particular reference thereto. However, it is to be appreciated that aspects of the present inventive subject matter are also amenable to other like networks and/or applications.

BACKGROUND

Wireless or mobile telecommunications networks are generally known in the art. A MS (e.g., a mobile telephone or other mobile or wireless end user device) obtains service and/or access to the wireless network via an over-the-air radio frequency (RF) interface with a base station (BS). Each BS provides the over-the-air interface for and/or serves a particular geographic coverage area known as a cell. Typically, a plurality of base stations are operatively connected to and/or served by a mobile switching center (MSC) that is responsible for routing traffic for a particular MS to the appropriate BS currently serving that MS (i.e., to the cell in which the MS is currently located). Commonly, in a wireless network, there are a plurality of such MSCs each serving a distinct collection of cells and/or base stations.

Generally, each MSC may serve a large number of cells. For example, a typical MSC may serve on the order of 200 cells. Often, the cells served by any one MSC are further divided or partitioned into distinct subsets or zones known as location areas (LAs). Each LA generally includes a plurality of neighboring cells served by the MSC. For example, each LA may contain on average around 50 cells and accordingly a typical MSC may include approximately 4 LAs.

The "mobility" in mobile communications is commonly achieved in part via two communication channels with the MS, namely, a paging channel and an access channel. The paging channel is used to verify and/or establish the location of the MS within the network and to deliver incoming calls to the MS. The access channel is used by the MS for registration purposes, i.e., to report power-up of the MS, to report changes in the location of the MS, etc.

Typically, a mobile service provider seeks to maximize the number of busy hour call attempts (BHCA) in order to serve an increasing number of mobile subscribers. One obstacle to achieving this goal, however, is the availability of sufficient paging channel bandwidth. While there are known ways to increase paging capacity, they often involve considerable expense and/or lead time, e.g., adding new bandwidth. Accordingly, it is desirable to optimize the usage of existing paging channel bandwidth.

Typically, when an incoming call arrives at a particular MSC that is intended for a specific MS, the MSC implements a designated paging strategy in an attempt to find the MS and deliver the call. That is to say, the MSC generally signals one or more of the base stations it serves to transmit paging signals over their paging channels to verify or establish the location of the MS within one of the cells served by the MSC. Generally, the MSC remembers or otherwise has access to information regarding the last known location of the MS being sought and the paging strategy may optionally be tailored accordingly. For example, the particular LA and/or cell in which the MS was located when the MS last accessed and/or communicated with the wireless network may be recorded (e.g., in a designated database (DB) or elsewhere) or otherwise remembered. Generally, these locations are referred to herein as the last seen or known LA or the last seen or known cell. However, due to the mobile nature of the MS, the MS may no longer be in one of the cells served by the particular MSC seeking the MS and accordingly the page goes unanswered.

Generally, when the first MSC (i.e., the anchor MSC) cannot locate the desired MS within its boundaries (i.e., when the paging strategy implemented by the anchor MSC is unsuccessful), the anchor MSC will then send an "intersystem page" request (e.g., an IS-41 ISPAGE2 message) to, e.g., a neighboring MSC (i.e., a border MSC). In response to the intersystem page request, the border MSC will in turn implement a designated paging strategy in an attempt to find the MS being sought.

The intersystem page request received by the border MSC commonly includes a "LocationAreaID" (LAID) parameter which the border MSC reads and/or otherwise uses to determine how to page the MS being sought. Conventionally, the anchor MSC (i.e., the MSC sending the intersystem page request) populates or fills the LAID parameter with a value indicating the last seen LA or the last seen cell for the MS being sought. In either case, the border MSC has to process this last seen location value to determine how and/or where to page the MS. For example, a database or the like has to be provisioned that can be used by the border MSC to identify how and/or where (i.e., in which cells served by the border MSC) to execute paging based on the LAID value obtained from the intersystem page request. However, such provisioning can be extensive and accordingly undesirable to carry out. Moreover, current provisioning at the border MSC usually results in the border MSC paging an entire LA, which can include on average around 50 cells. Such a large use of paging resources is generally undesirable.

Accordingly, a new and improved paging system and/or method for a wireless telecommunications network is disclosed that overcomes the above-referenced problems and others.

SUMMARY

In accordance with one embodiment, a method is provided for paging a mobile station served by a wireless telecommunications network. The method includes: remembering a last known location of the mobile station, and implementing a first paging strategy for the mobile station within a first collection of cells served by a first mobile switching center. If a response to the first paging strategy is not received by the first mobile switching center, then the method further includes: selecting one or more cells served by a second mobile switching center based upon the last known location of the mobile station; identifying the selected cells in an intersystem paging request; forwarding the intersystem paging request from the first mobile switching center to the second mobile switching center; and, in response to the second mobile switching center receiving the intersystem paging request, paging the mobile station in those cells served by the second mobile switching center which are identified in the intersystem paging request.

In accordance with another aspect, a wireless telecommunications network serving a mobile station includes: a first mobile switching center (MSC) serving a first collection of cells; and, a second MSC serving a second collection of cells. The first MSC implements a first paging strategy for the MS when the MS is being sought by the network and if a response to the first paging strategy is not returned from the MS, then: the first MSC selects one or more cells served by the second MSC based upon a last known location of the MS; the selected cells are identified in an intersystem page request (IPR) that is forwarded to the second MSC; and, the second MSC pages the MS in the cells identified in the IPR.

Numerous advantages and benefits of the inventive subject matter disclosed herein will become apparent to those of ordinary skill in the art upon reading and understanding the present specification.

BRIEF DESCRIPTION OF THE DRAWINGS

The present inventive subject matter may take form in various components and arrangements of components, and in various steps and arrangements of steps. The drawings are only for purposes of illustrating example embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components and features that are commonly known in the telecommunication arts without further detailed explanation as to their configuration or operation except to the extent they have been modified or altered in accordance with and/or to accommodate the embodiment(s) presented herein.

Figure 1:
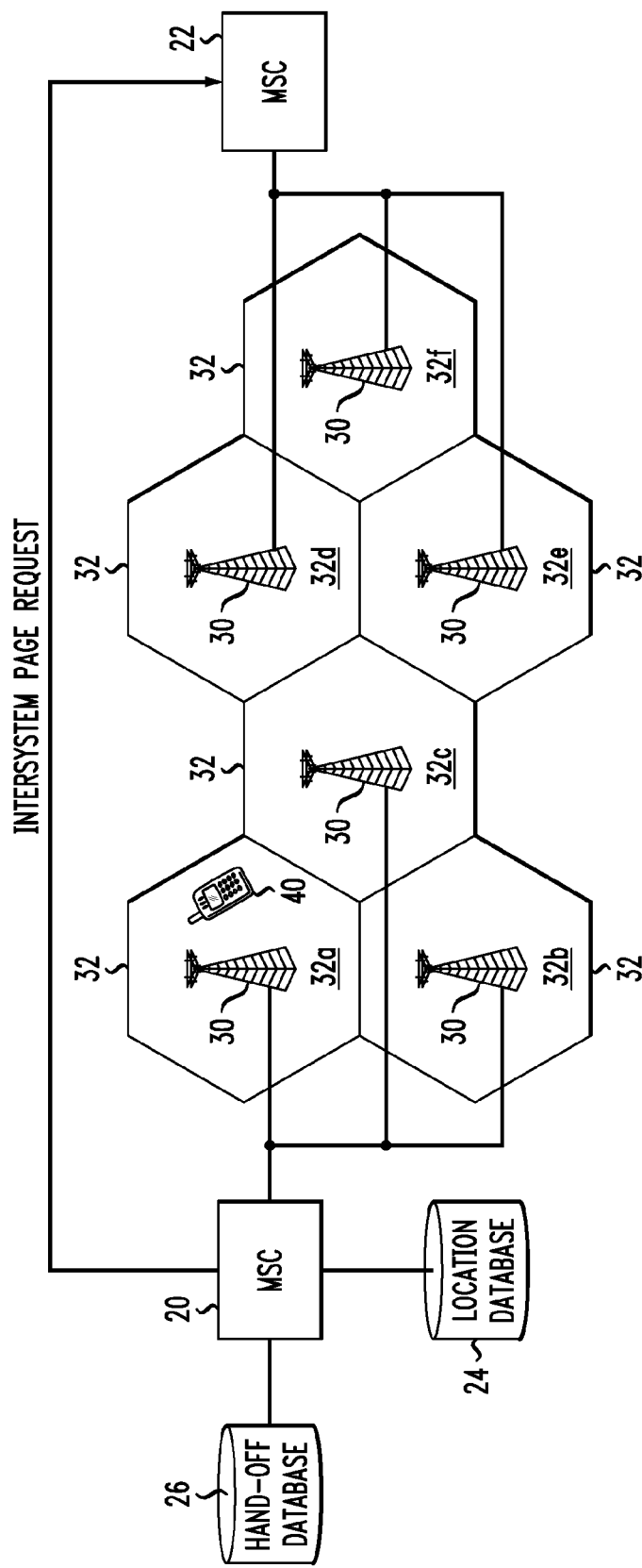
FIG. 1 is a diagram illustrating a exemplary telecommunications network suitable for practicing aspects of the present inventive subject matter.

With reference to FIG. 1, a wireless telecommunications network A includes a plurality of MSCs. In the illustrated example, only two MSCs (i.e., an anchor MSC 20 and a border MSC 22) are shown for simplicity and clarity herein. However, in practice, more than two such MSCs may be similarly arranged within the network A.

As shown, each MSC is operatively connected to and/or in communication with a plurality of base stations 30 in the usual manner. As is understood in the art, each BS 30 provides an over-the-air radio frequency interface for its respective geographic area or cell 32. Selectively, a MS (such as the exemplary MS 40 illustrated) is provided telecommunication services and/or otherwise accesses the network A via the interface and/or BS 30 serving the cell 32 in which the MS 40 is located. In the usual manner, two communication channels are selectively employed between the BS 30 and the MS 40, namely, a paging channel and an access channel. The paging channel is used to verify and/or establish the location of the MS 40 within the network A. The access channel is used by the MS 40 for registration purposes, i.e., to report power-up of the MS 40, to report changes in the location of the MS 40, etc.

While each MSC is shown serving three BS 30 and three corresponding cells 32, it is to be appreciated that more or less than three base stations and/or cells may be similarly situated with respect to any of the one or more MSCs in the network A. That is to say, each MSC in the network A may optionally serve any number of one or more base stations and/or corresponding cells. Additionally, while not shown, the cells 32 served by any one MSC are optionally divided or partitioned into distinct subsets or zones known as location areas (LAs). Each LA generally includes a plurality of neighboring cells 32 served by the respective MSC. Moreover, while only one exemplary MS is illustrated in FIG. 1, the network A optionally serves any number of one or more mobile stations similarly situated and/or arranged in any of the one or more cells 32.

Suitably, as the MS 40 travels, it registers its current location with the respective MSC each time it crosses a defined registration boundary. For example, the MS 40 registers with the MSC 20 serving its location by sending a registration signal to the MSC 20 using the access channel. In this manner, the MSC 20 is able to remember the most recent geographic area from which the MS 40 registered. For example, the MSC 20 may store the last known registration information (including, e.g., the identity of the cell 32 and/or LA from which the MS 40 last registered) in a location register or database 24. In addition, the last or most recent cell 32 and/or LA used to communicate with the MS 40 during a network access event is also monitored and/or stored by the network A. The identity of this cell 32 and/or LA is optionally stored or maintained along with and/or as part of the information in the database 24. Network access events include those events where the MS 40 accesses the network A, i.e., the MS 40 sends, receives or otherwise exchanges a transmission to, from or with a BS 30. For example, a network access event may include, registration of the MS 40, the MS 40 receiving an incoming call, the MS 40 placing an outgoing call, the transmission of packet data to or from the MS 40, receipt or transmittal of a message using short-message-service (SMS), etc. For each of these activities, the network A is able to determine which cell 32 and/or LA is being used to communicate with the MS 40. Suitably, the identity of this cell 32 and/or LA is captured and/or updated at each network access event, e.g., by the MSC 20.

When the MS 40 is being sought by the network A (e.g., when an incoming call arrives at the MSC 20 for the MS 40), an appropriate page is sent out for the MS 40 via the paging channel. Optionally, the MSC 20 is provisioned with the capability of paging various different regions, e.g., a single cell region, an LA region, a LAC (LA Cluster) region, a CLAC (Customized LAC) region or the entire MSC region, with any given page attempt. Suitably, a paging strategy implemented by the MSC 20 is based upon the last known location of the MS 40, e.g., as recorded in the location register or database 24. Of course, depending upon if and/or when the page is answered, multiple pages may be attempted in accordance with the implemented paging strategy. Accordingly, the paging strategy implemented by the MSC 20 defines the number of page attempts and the type of paging region to be used for each successive attempt. Suitably, the paging strategy implemented optionally varies depending upon the last known location or cell 32 or LA of the MS 40 being sought, e.g., as recorded in the location register or database (DB) 24.

If no answer is received from the MS 40 in response to the paging strategy implemented by the MSC 20 (e.g., because the MS 40 is no longer in a cell 32 served by the MSC 20), then the anchor MSC 20 generates and selectively sends an intersystem page request (IPR) (e.g., an IS-41 ISPAGE2 message) to the border MSC 22. Suitably, the IPR contains a list of cells 32 served by the border MSC 22, e.g., included in the LAID parameter. More specifically, the anchor MSC 20 determines the last known or seen location of the MS 40, e.g., the last seen or known cell 32 of the MS 40 as recorded or otherwise maintained in the location DB 24, and from this information, the anchor MSC 20 then identifies one or more cells 32 server by the border MSC 22. Suitably, the goal is to identify those cells 32 server by the border MSC 22 in which the MS 40 is most likely to currently reside, e.g., the cells 32 served by the border MSC 22 that are adjacent, neighboring or otherwise nearest to the last known cell 32 of the MS 40. Significantly, a list of adjacent, neighboring or otherwise nearest cells 32 served by the border MSC 22 with respect to any given cell 32 served by the anchor MSC 20 is available to the anchor MSC 20 from a hand-off information DB 26 or the like which is already provisioned to aid in the negotiation of call hand-offs when the MS 40 roams or travels from a cell 32 served by the MSC 20 to a cell 32 served by the MSC 22.

In any event, upon receiving the IPR from the anchor MSC 20, the border MSC 22 reads or otherwise obtains the list of identified cells 32, e.g., from LAID parameter. In response, the border MSC 22 implements a page for the MS 40 in the identified cells 32 obtained from the IPR. Notably, paging resources are conserved insomuch as the page is limited to the cells 32 identified in the IPR. Moreover, insomuch as the IPR expressly identifies those cells 32 which are to be paged, the border MSC 22 is relieved of having to be provisioned with additional resources for determining where or what cells 32 to page in response to the received IPR.

For example, assuming the last known cell 32 of the MS 40 recorded and/or maintained in the location DB 24 is cell 32*c*. If no answer is received from the MS 40 in response to a paging strategy implemented by the MSC 20 (e.g., because the MS 40 is no longer in a cell 32 served by the MSC 20), then the anchor MSC 20 generates and selectively sends an intersystem page request (IPR) (e.g., an IS-41 ISPAGE2 message) to the border MSC 22. Suitably, the MSC 20 access the location DB 24 to determine that the last known location of the MS 40 was cells 32*c*. In turn, the MSC 20 queries the existing hand-off information DB 26 to find the cells 32 served by the border MSC 22 that are adjacent, neighboring or otherwise nearest to cell 32*c*—namely, cells 32*d* and 32*e* in this example. Accordingly, the anchor MSC 20 lists and/or otherwise identifies cells 32*d* and 32*e* in the IPR, e.g., under the LAID parameter. When the border MSC 22 receives the IPR from the anchor MSC 20, the border MSC 22 reads or otherwise obtains the identities of the listed cells 32—namely, cells 32*d* and 32*e* in this example. Accordingly, the border MSC 22 complies with the IPR by paging the MS 40 in the cells 32*d* and 32*e*.

Figure 2:
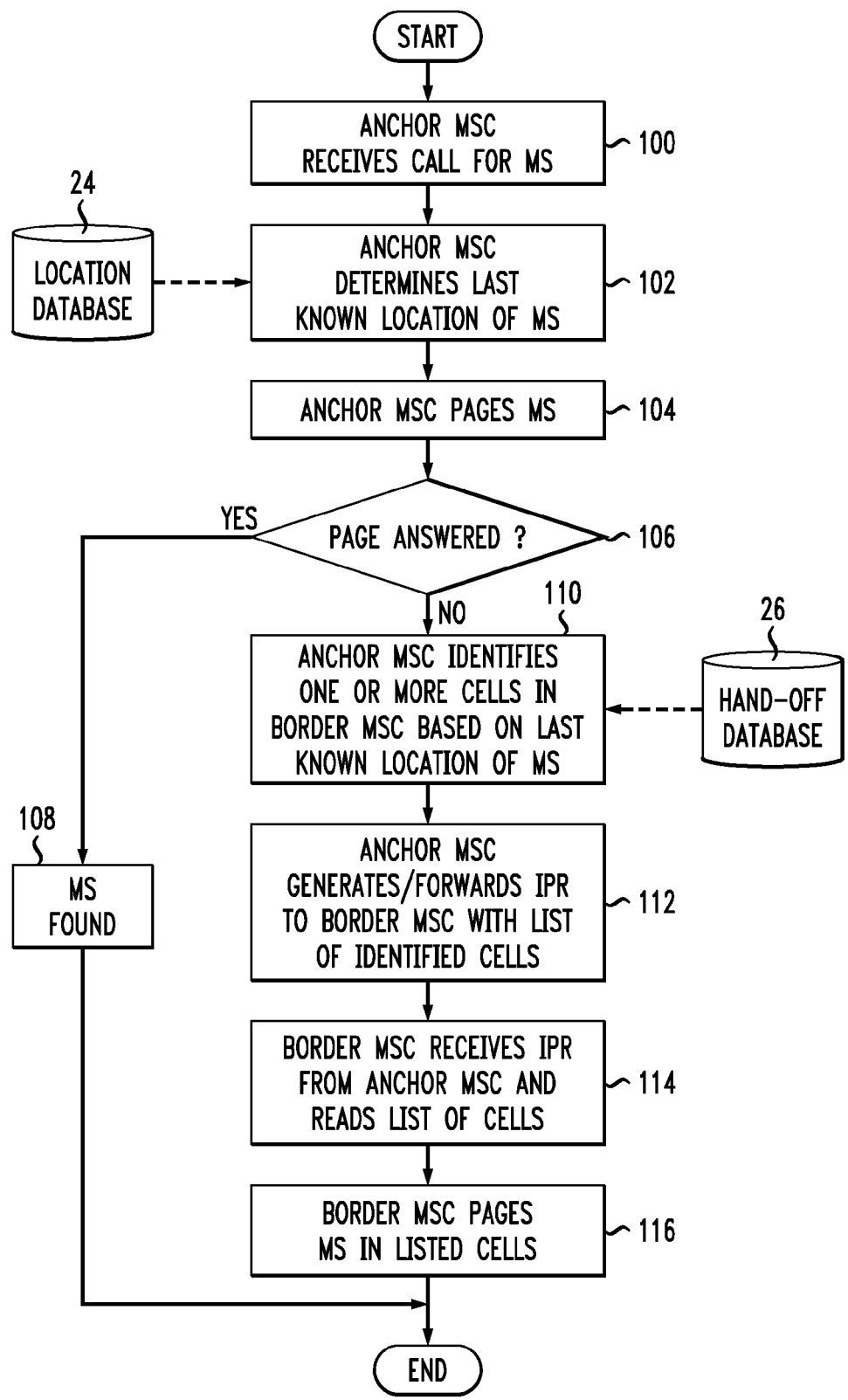
FIG. 2 is a flow chart illustrating an exemplary paging process that embodies aspects of the present inventive subject matter.

With reference to FIG. 2, operation of an exemplary paging process will now be described. The process begins at step 100 with the MSC 20 receiving a call that is, e.g., to be routed to the MS 40. Accordingly, at step 102, the MSC 20 determines the last known location of the MS 40, e.g., by querying the DB 24 to obtain the identity of the cell 32 employed by the MS 40 for its most recent network access event or registration.

At step 104, the MSC 20 implements a designated paging strategy in an attempt to locate the MS 40. Optionally, the designated paging strategy implemented by the anchor MSC 20 may be depended upon the last known location of the MS 40 as determined in step 102.

In any event, at decision step 106, it is determined if the MS 40 has answered the page or responded to the paging strategy implemented by the anchor MSC 20 in step 104. If the page is answered, then the MS 40 has been found by the MSC 20 as indicated in box 108 and the paging process may end. Otherwise, if the page is not answered (e.g., because the MS 40 is no longer in a cell 32 served by the MSC 20), then the paging process branches to step 110.

At step 110, the anchor MSC 20 identifies one or more cells 32 served by the border MSC 22 based on the last seen or known location of the MS 40, e.g., as determined in step 102. Suitably, the anchor MSC 20 queries the existing hand-off information DB 26 to obtain the identity of those cells 32 served by the border MSC 22 which are adjacent, neighboring or otherwise nearest to the last known location of the MS 40 as determined in step 102. At step 112, the anchor MSC 20 generates and/or forwards an IPR to the border MSC 22 along with the list of cells 32 identified in step 110. For example, the list of cells 32 identified in step 110 are optionally contained in the LAID parameter of the IPR.

At step 114, the border MSC 22 receives the IPR from the anchor MSC 20 and reads or otherwise obtains the list of cells 32 contained therein, i.e., those cells 32 identified in step 110. Accordingly, at step 116, the border MSC 22 complies with the received IPR by paging the MS 40 in the cells 32 listed and/or otherwise identified in the IPR.

While the example(s) above have been described with respect to a single border MSC 22, in practice, more than one border MSC may be relevant. That is to say, more than one MSC may serve different cells that border those served by the anchor MSC 20. Accordingly, the anchor MSC 20 may generate and/or forward an IPR to multiple border MSCs when the paging strategy initially employed by the anchor MSC 20 fails to locate the MS 40. In such cases, the anchor MSC 20 optionally selects particular cells served by a plurality of border MSCs (e.g., again using the last known location of the MS 40 optionally obtained from the location DB 24 and the neighboring cell information optionally obtained from the existing hand-off information DB 26) and the IPR sent to each border MSC then suitably lists those cells served by the respective border MSCs that are to be paged in compliance with the IPR received by the respective border MSCs.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A wireless telecommunications network serving a mobile station (MS), said network comprising:
   a first mobile switching center (MSC) serving a first collection of cells; and, a second MSC serving a second collection of cells;

wherein the first MSC implements a first paging strategy for the MS when the MS is being sought by the network and if a response to the first paging strategy is not returned from the MS, then:

the first MSC selects one or more cells served by the second MSC based upon a last known location of the MS;

the selected cells are identified in an intersystem page request (IPR) that is forwarded to the second MSC; and, the second MSC pages the MS in the cells identified in the IPR.

2. The network of claim 1, wherein the last known location of the MS is a last known cell served by the first MSC which the MS last used to access the network.

3. The network of claim 2, wherein the selected cells are those cells served by the second MSC that are neighboring the last known cell served by the first MSC.

4. The network of claim 3, said network further comprising:

a location database (DB) in which is recorded the last known location of the MS.

5. The network of claim 4, said network further comprising:

a hand-off information DB provisioned to aid in the negotiation of hand-offs between cells served by the first and second MSCs.

6. The network of claim 5, wherein the first MSC selects the cells to identify in the IPR by accessing the hand-off information DB to find cells served by the second MSC which are nearest to the last known location of the MS recorded in the location DB.

* * * * *